(No Model.) 2 Sheets—Sheet 1.

A. J. GASKING.
MACHINE BELTING.

No. 362,269. Patented May 3, 1887.

Witnesses:
W. R. Haight
A. Tichtl

Inventor:
Alfred John Gasking,
by Wm. H. Babcock
Attorney.

(No Model.) 2 Sheets—Sheet 2.

A. J. GASKING.
MACHINE BELTING.

No. 362,269. Patented May 3, 1887

Witnesses:
W. R. Haight,
A. Zichtl.

Inventor:
Alfred John Gasking
by W. H. Babcock
Attorney

UNITED STATES PATENT OFFICE.

ALFRED JOHN GASKING, OF ENFIELD, COUNTY OF MIDDLESEX, ASSIGNOR TO THE GASKING PATENT DRIVING BELT AND LEATHER COMPANY, (LIMITED,) OF LONDON, ENGLAND.

MACHINE-BELTING.

SPECIFICATION forming part of Letters Patent No. 362,269, dated May 3, 1887.

Application filed February 23, 1887. Serial No. 228,632. (No model.) Patented in England December 9, 1886, No. 16,120.

*To all whom it may concern:*

Be it known that I, ALFRED JOHN GASKING, of Enfield, in the county of Middlesex, managing director, and a subject of the Queen of Great Britain, have invented certain new and useful Improvements in Bands or Chains for the Transmission of Work; and I do hereby declare that the following is a sufficient description of the invention to enable those skilled in the art to which it appertains to carry the same into practical effect.

This invention has for its object improvements in bands or chains for the transmission of work, and which combines adhesive qualities with tensile and torsional strength, while at the same time considerable flexibility is retained and the band may be used with equal facility on either side thereof, thus enabling both faces to be used at the same time, if desired, in driving from the same band without detriment thereto.

In some respects the bands are similar in construction to those described in the specification of my patent, No. 344,098, of June 22, 1886—i. e., I use metal links and pins with small sections of leather or other suitable material connected therewith; but in the former case the tension was in many cases taken wholly by the metal links, only a portion of the total length being assisted by the tensile strength of the leather (or other material) itself, whereas according to my prevent invention I thread the pieces of leather or other material to either lap each other alternately in each piece or thickness of leather or in blocks or groups of, say, two or more thicknesses, and probably in medium-width bands two thicknesses would be correct, except at the outer edges, where two single ones may be used, or two single ones crossing each other at the center of their length. By this means I obtain the strength of the leather itself in tension as well as of the metal links, each assisting and supporting the other. Besides this, the general and regular elasticity is more equal and the strain is less severe upon the cross-pins when the band is twisted. Indeed, it approaches nearer to a solid leather band, without its disadvantages and with many advantages.

In some cases I make the holes in the metal links oblong or larger than the pin, and in making the band at first I couple the parts together, with the pins as near together as possible, the leather sections having round holes and agreeing with the shortest pitch of the holes in links, thus allowing, in the first place, all the strain to come direct upon the leather sections themselves until the band is thoroughly stretched, when the metal links would take up and bear their part of the strain, thus reducing the strain upon the leather sections and dividing it with them. I make these sections of leather or other material of any length, shape, or size, and couple them up together in any way most suitable for various purposes, as described in the specification of my patent, No. 344,098, of June 22, 1886. The metal links may be made any shape most suitable for various purposes; but sometimes I form them with a projection which is pierced with one or more holes in order to attach appliances to one side of the belt for such purposes as elevating or moving various substances and other similar objects.

In order that my invention may be thoroughly understood, I have appended hereunto two sheets of drawings, upon which several modifications are shown which will serve to illustrate the principle.

Figure 4:
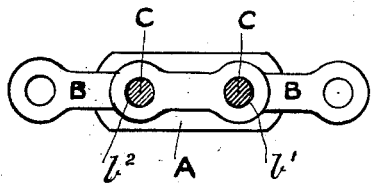

Fig. 4 is a horizontal sectional elevation through two pins C for the purpose of showing that the pins are so left in the leather pieces A as to allow them to slightly stretch or bed themselves before taking a bearing upon the side of the holes of the links B—i. e., the metal links are slightly larger in pitch than the leather pieces A—or the holes in B may be made oval horizontally, or the holes may be slightly larger in diameter, which allows the necessary stretch, as set forth. Small spaces $b'$ and $b^2$ are marked in the metal links, which allow for stretch.

Figure 5:
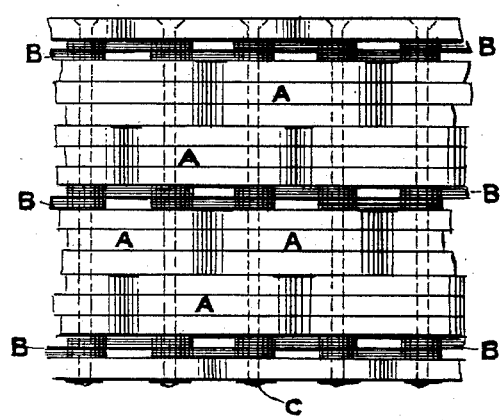
Figure 6:

Figs. 5 and 6 are plan and edge elevation of a modification showing three thicknesses of leather groups A crossing each other lengthwise, and with three rows of metal links B, but otherwise tightened up to allow of the leather stretching, as previously explained for Fig. 4.

Figure 7:
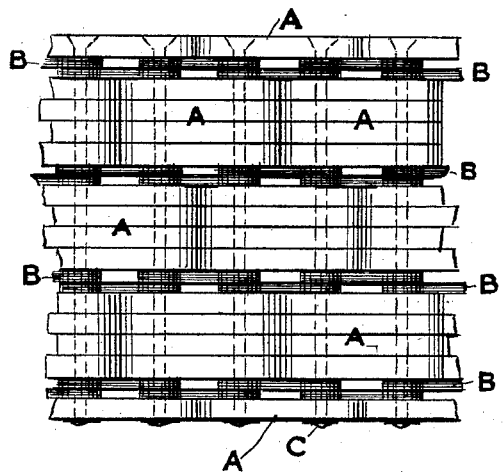
Figure 8:

Figs. 7 and 8 are plan and edge elevation of a band with four leathers A grouped together in three single rows and four rows of metal links B; but otherwise the construction is practically the same.

Figure 11:
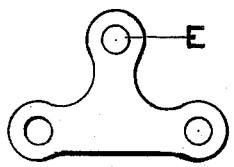
Figure 10:
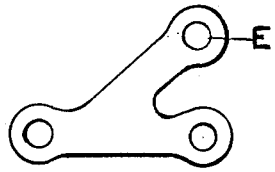
Figure 9:
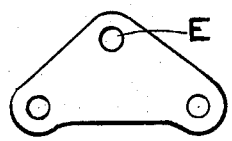

Figs. 9, 10, and 11 show metal links of a special kind, which may be used at intervals in the construction of these bands to receive elevators at the holes E and other attachments used upon bands. Of course the shapes may be varied to suit circumstances.

Figure 3:
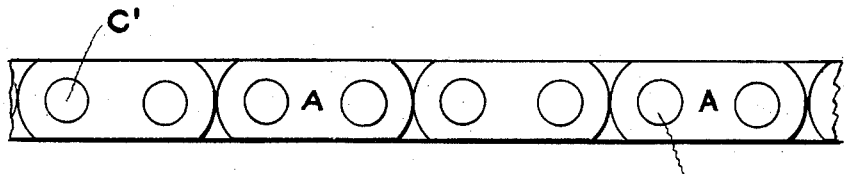
Fig. 3 is a similar elevation to Fig. 2, but showing that edge of the belt which receives the heads C' of the pins C.
Figure 1:
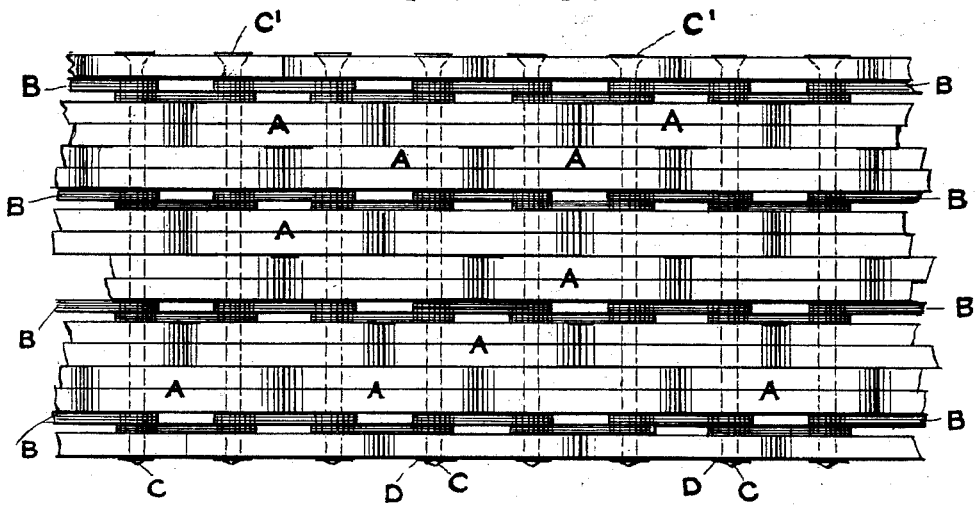
Figure 1 is a plan showing a very strong band made up of the leather sections A, which are made of two thicknesses except at the outer edges, which are generally one thickness, and the metal links B and the pins C and washers D.
Figure 2:
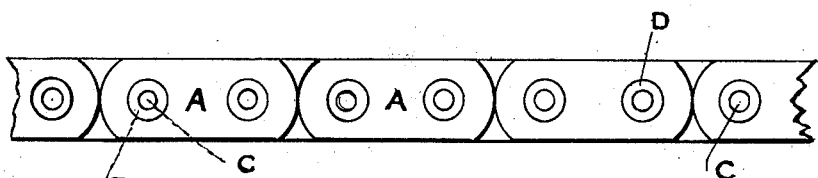
Fig. 2 is a side elevation of the edge of the belt, showing the washers D and pins C.
Figure 12:
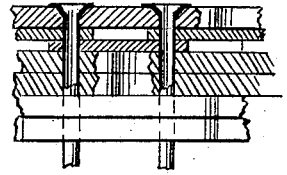

Fig. 12 represents a detail view of a modification in which hollow pins are used for my improved belt or chain.

It will be noticed in all cases that both the leather sections A and the links B must be broken before the band can be severed, the tension being divided between the two. In many cases hollow tubes may be used in the place of the solid pins C, which would be opened out like an eyelet at each end, thus making the band lighter, and the riveting is saved.

What I claim, then, is—

1. The flexible pieces A, overlapping each other, in combination with the transverse rods C, passed through holes in said sections, and the overlapping metallic links B, having elongated slots through which said rods pass, in order that the strain may come first on the leather or other flexible pieces A, and on the links B only after these pieces yield, substantially as set forth.

2. The combination of hollow pins having their ends spread to form eyelets with alternating overlapping slotted metallic links and pieces of perforated leather, substantially as set forth.

In testimony that I claim the foregoing as my own I affix my name in the presence of two witnesses.

ALFRED JOHN GASKING.

Witnesses:
HERBERT E. DALE,
THOMAS LAKE,
*Both of* 17 *Gracechurch Street, London, E. C.*